June 18, 1968  YOSHIHIRO OKUNO  3,389,266
APPARATUS FOR MEASURING MINUTE VELOCITY FLUCTUATIONS
Filed Jan. 20, 1964
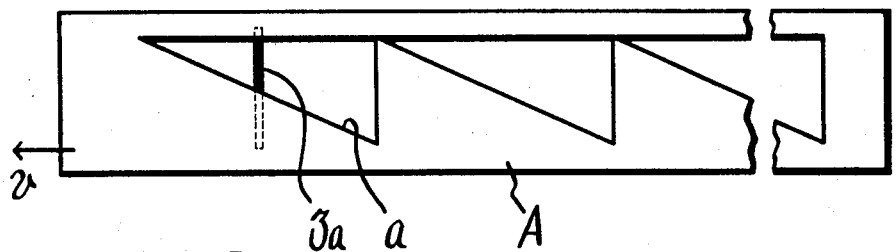
Fig. 1.
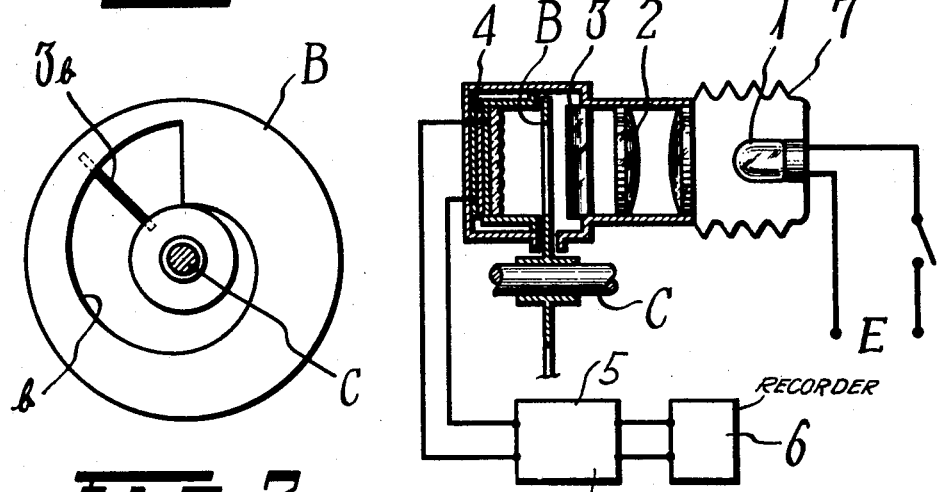
Fig. 2.
Fig. 3.
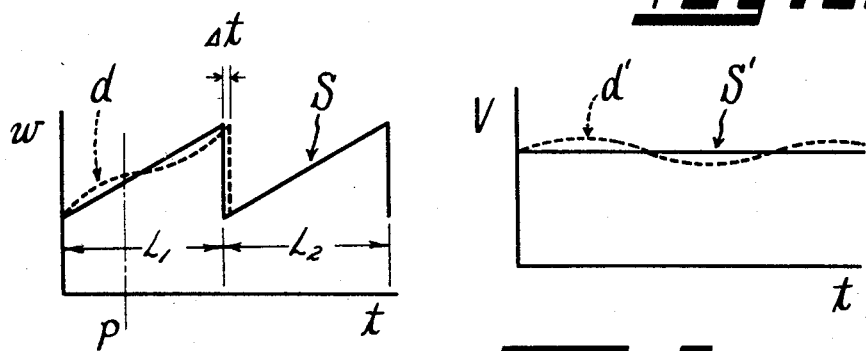
Fig. 4.
Fig. 5.
INVENTOR
Yoshihiro Okuno
BY Mason, Fenwick & Lawrence
ATTORNEY

United States Patent Office 3,389,266
Patented June 18, 1968

3,389,266
APPARATUS FOR MEASURING MINUTE
VELOCITY FLUCTUATIONS
Yoshihiro Okuno, Osaka Prefecture, Japan, assignor to
Kabushika Kaisha Daikin Seisakusho, Osaka, Japan, a
corporation of Japan
Filed Jan. 20, 1964, Ser. No. 338,996
Claims priority, application Japan, Jan. 26, 1963,
38/3,810
7 Claims. (Cl. 250—231)

The present invention relates to an apparatus for measuring minute fluctuations in linear and angular velocities.

A number of methods and apparatus to measure the velocity of a body moving linearly or rotating are known. Many of them are meant, however, to measure the quantity of movement or revolution of a body in a given space of time. Thus, the average value of a linear or angular velocity measured in a given time is shown, and not the difference at a given moment between the fixed standard velocity and the actual figure. This is clear from symbols like m./s., r.p.m., etc. expressing these velocities.

The present invention purports to measure the difference between the linear or angular velocity of a body and that previously fixed. FIG. 1 is a front view of the basic form of a screen to measure fluctuations in the velocity of a body moving linearly used in the present invention. FIG. 2 is a front view of the basic form of a screen to measure fluctuations in the velocity of a rotating body. FIG. 3 is a side view of the basic form of an apparatus covered by the present invention. FIG. 4 is a diagram of values obtained in the present invention. FIG. 5 is a diagram in which the values in FIG. 4 are arranged by a differential circuit.

The following is a detailed explanation of the embodiment of the present invention in connection with the drawings.

The screens used for measurement in the present invention are shown in FIGS. 1 and 2. To measure fluctuations in the velocity of a linearly moving body, the tape-shaped screen A consisting of one or a series of triangular windows $a$ with a proportionately enlarged width (FIG. 1) or similar windows is attached to the above-mentioned moving body. To measure fluctuations in the velocity of a rotating body, the disc-shaped screen B consisting of proportionately enlarged windows $b$ arranged circumferentially is attached axially to the shaft $c$ of the rotating body.

The basic form of an apparatus covered by the present invention is illustrated in FIG. 3. Light coming from the light source 1, which is a suitable luminous body, is condensed by the optical condenser 2 consisting of lenses, and the light going through the condenser 2 is transformed into a ray by the cylindrical lens 3 or the slit provided in the wall. This ray is to be projected to the semiconductive photoelectric element 4, such as a photo transistor, photoelectric cell, etc., provided on the receiving side of the dark room. The screen A or B is inserted between the cylindrical lens 3, the slit or the like, and the semiconductive photoelectric element 4. FIG. 3 shows the screen B inserted.

It will be seen from the foregoing that the length of ray interrupted by the screen as the body moves linearly or rotates can be increased or decreased proportionately by the windows of the screen and that the amount of light projected to the semiconductive element 4 can also be increased or decreased. Since the semiconductive photoelectric element 4, as is known, can adjust the amount of current in proportion to that of light received, it is possible to lead current, which goes through the semiconductive photoelectric element 4, to the amplifier 5 with a differential circuit and record it with the recorder 6.

The symbol E in the drawing stands for the power source of the light source 1; and 3a and 3b, for the rays condensed by the cylindrical lens 3; 7, for the light source-hood 1.

The workings of the present invention will be self-explanatory from the foregoing.

When, for instance, the screen A in FIG. 1 is fitted to a body moving at the velocity V, the ray 3a condensed by the cylindrical lens 3 will go through the windows $a$ of the screen A and will be projected to the semiconductive photoelectric element 4. In accordance with the amount of this light, voltage given to the semiconductive photoelectric element 4 or the amount of current originating therefrom will change. So when the screen A moves in the direction marked with an arrow at the velocity V, light going through the windows $a$ from the cylindrical lens 3 will increase in amount gradually and will be received by the semiconductive photoelectric element 4. The amount of current going through the semiconductive photoelectric element 4 or originating therefrom will increase in proportion to the amount of light received.

The same results will be obtained, when the screen A is replaced by the screen B provided on the shaft C of the rotating body.

Fluctuations in the above-mentioned current will be recorded by the recorder 6 through the amplifier 5.

When a series of triangular windows $a$ provided in the screen A as indicated in the drawing or the disc-shaped screen B is made to rotate continuously, the saw tooth curve shown in a solid line S in FIG. 4 will be recorded by the recorder 6, provided the linear or angular velocity is constant.

The amount of time $t$ needed to move the body by the distance L or to rotate it N times is recorded on the horizontal axis, while on the vertical axis is recorded the amount of light $w$ passing the triangular windows $a$ or the windows $b$ set up on the disc. Thus, a saw tooth curve comprising a series of mountain-shaped curves L1, L2 ... whose number corresponds to that of the triangular windows $a$ or the windows $b$ provided on the disc will be recorded.

In this case, when there is a minute fluctuation in the aforesaid linear or angular velocity while the body is moving or rotating, the windows $a$ or $b$ will cause a small change in the velocity between the receiving side of the dark room and the cylindrical lens 3. It follows, therefore, that the said velocity will be slightly different from the strictly constant linear or angular velocity, which will immediately present itself as a change in the amount of light received by the semiconductive photoelectric element 4. The broken curve $d$ will then be recorded by the recorder. This means that the above difference is quite easy to read as indicated in the drawing.

An instant linear or angular velocity at a given time can be shown by the gradient $dw/dt$ of the tangent of the curve $w-t$ (FIG. 4). That is to say, at a strictly constant linear or angular velocity, the gradient $dw/dp$ of the saw tooth line S shows the constant value, and when there is a fluctuation, the gradient $dw/dt$ of the broken line $d$ shows the instant velocity.

When, therefore, a differential circuit is added or a gradient for the curve $w-t$ is obtained for graphing, the instant linear or angular velocity $d'$ as in FIG. 5 will be obtained. From this, the difference between $d'$ and the fixed standard velocity $s'$ can be known.

By reading $\Delta t$ in FIG. 4, the difference between the fixed standard velocity and the average velocity between each pitch can be obtained.

I claim:
1. Apparatus for measuring minute velocity fluctuations of a moving body comprising electrical photosensitive means, means for projecting a narrow beam of light on said photosensitive means, said photosensitive means having means connectable to electrical circuitry for impressing a voltage on said photosensitive means, said circuitry including means for amplifying, differentiating and recording the current passing through said photosensitive means and means mountable for movement with said body, movable along a line of travel intersecting said light beam, said movable means having at least one opening extending along the line of travel thereof and said opening having diverging opposed side edges intersecting said light beam whereby the effective length of said light beam incident upon said photosensitive means varies corresponding to the movement of said movable means along the line of travel thereof.

2. Apparatus for measuring minute velocity fluctuations of a moving body according to claim 1, wherein said movable means comprises an elongated strip member.

3. Apparatus for measuring minute velocity fluctuations according to claim 2, wherein said openings are triangular shaped.

4. Apparatus for measuring minute velocity fluctuations of a moving body according to claim 2, wherein said electrical photosensitive means comprises a semiconductive photosensitive element.

5. Apparatus for measuring minute velocity fluctuations of a moving body according to claim 1, wherein said movable means comprises a rotatable member.

6. Apparatus for measuring minute velocity fluctuations according to claim 5, wherein said opposed diverging side edges of said opening are curved about the center of rotation of said rotatable member.

7. Apparatus for measuring minute velocity fluctuations of a moving body according to claim 5, wherein said electrical photosensitive means comprises a semiconductive photosensitive element.

References Cited

UNITED STATES PATENTS

| | | | |
|---|---|---|---|
| 2,142,378 | 1/1939 | Sachtleben | 250—237 X |
| 3,087,069 | 4/1963 | Moncrieff-Yeates | 250—211 |
| 3,102,227 | 8/1963 | DeGier | 250—209 X |
| 3,171,034 | 2/1965 | Tomasulo et al. | 250—211 |
| 3,194,967 | 7/1965 | Mash | 250—237 X |
| 3,206,719 | 9/1965 | Pure | 250—237 X |

RALPH G. NILSON, *Primary Examiner.*

J. D. WALL, M. A. LEAVITT, *Assistant Examiners.*